(12) United States Patent
Ferus et al.

(10) Patent No.: US 10,533,671 B2
(45) Date of Patent: Jan. 14, 2020

(54) CHECK VALVE

(71) Applicant: Hamilton Sundstrand Corporation, Charlotte, NC (US)

(72) Inventors: Hanna Ferus, Wroclaw (PL); Łukasz Wiktorko, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/806,449

(22) Filed: Nov. 8, 2017

(65) Prior Publication Data

US 2018/0128388 A1 May 10, 2018

(30) Foreign Application Priority Data

Nov. 8, 2016 (EP) .................... 16461569

(51) Int. Cl.
*F16K 15/03* (2006.01)
*F16K 31/53* (2006.01)
*F16K 27/02* (2006.01)

(52) U.S. Cl.
CPC .......... *F16K 15/038* (2013.01); *F16K 31/535* (2013.01); *F16K 27/0209* (2013.01); *Y10T 137/7839* (2015.04)

(58) Field of Classification Search
CPC ............. Y10T 137/7839; F16K 15/038; F16K 15/036; F16K 31/535; F16K 27/0209
See application file for complete search history.

(56) References Cited

U.S. PATENT DOCUMENTS 3,384,112 A 5/1968 Smith

FOREIGN PATENT DOCUMENTS

| DE | 10151584 A1 | 6/2002 |
| EP | 1895212 A1 | 3/2008 |
| EP | 2290298 A2 | 3/2011 |
| GB | 1076671 A | 7/1967 |

OTHER PUBLICATIONS

Extended European Search Report for International Application No. 16461569.2 dated Apr. 28, 2017, 8 pages.

*Primary Examiner* — Marina A Tietjen
*Assistant Examiner* — Frederick D Soski
(74) *Attorney, Agent, or Firm* — Cantor Colburn LLP

(57) ABSTRACT

A flapper element for a check valve comprises at least one mounting lug configured to receive a shaft for rotation relative thereto and having a row of teeth for engaging complementary teeth on a mounting lug of a similar flapper element. The complementary teeth tie the rotation of the two flapper elements.

10 Claims, 5 Drawing Sheets

CHECK VALVE

FOREIGN PRIORITY

This application claims priority to European Patent Application No. 16461569.2 filed Nov. 8, 2016, the entire contents of which is incorporated herein by reference.

TECHNICAL FIELD

The present disclosure relates to check valves and flapper elements for such valves.

BACKGROUND

It is known to use check valves to allow fluid flow in one direction, and to prevent flow in the opposite direction. Check valves are widely used in a wide variety of applications, for example in air conditioning systems, for example in aircraft air conditioning systems.

Check valves commonly include a pair of flapper (or valve) elements disposed over a pair of openings in a valve housing. The flapper elements are hingedly supported on a shaft (or 'hinge-pin') mounted to the valve housing for rotation between a closed position in which they lie across and close the opening, preventing fluid flow through the opening in one direction and an open position in which, under the pressure of a fluid (gas or liquid) on one side of the check valve, the flapper elements rotate from their closed positions so as to allow the fluid to flow through the valve in the opposite direction.

In known check valve arrangements, a stop is typically provided to limit the rotational movement of the flapper elements as they open. In some arrangements, the stop comprises a stop pin which is mounted to mounting posts arranged on opposed sides of the valve housing opening. The stop pin is spaced from the opening such that when the flappers open, they engage the stop pin.

The flapper elements of such prior art flapper valves typically do not reach the fully open position, and thus the stop pin, simultaneously. This results in a slight delay between impacts against the stop pin, which may result in uneven stress distribution within various components of the check valve, and as a consequence, damage the valve. This may require the components within the check valve to be relatively heavy in order to withstand the impact force of the flapper elements and to avoid the costly and time consuming process of replacing damaged parts. Additionally, uneven pressure distribution across the valve may result in only one of the flapper elements opening, or partially opening, which may diminish valve performance and/or efficiency during operation.

In order to mitigate the aforementioned problem of poor valve efficiencies and unbalanced stress distribution within the check valve, typical prior check valves require the use of power actuation systems to control the flapper elements during operation. Not only does this dramatically increase the complexity and cost of the valve, but also further increases the weight of the check valve, which may have implications in aircraft applications, for example.

SUMMARY

According to the present disclosure, there is provided a flapper element for use in a check valve. The flapper element comprises at least one mounting lug. The lug or lugs is/are configured to receive a shaft (or 'hinge-pin') for rotation relative thereto, and has/have a row of teeth for engaging complementary teeth on a mounting lug of a similar (or identical) flapper element.

In use, the teeth of the flapper element are engaged with the teeth of a similar (or identical) flapper element such that their rotation is tied together. In other words, rotating one flapper element causes the rotation of the other flapper element. This allows the flapper elements to be assembled such that they open at the same angle as each other (relative to a valve housing).

The term "teeth" should be understood to refer to parts that protrude from an outer surface of the mounting lug, such that they can engage teeth on the mounting lug of another flapper element. The teeth may be formed by adding material to the mounting lug outer surface or removing material from the mounting lug outer surface. An example of a row of teeth is gear teeth, having a regular series of ridges and valleys.

The term "row" should be understood to mean a plurality of teeth in a line that may or may not be straight. In one embodiment, the row forms a straight line that, for example, extends about a circumferential surface of the mounting lug.

The teeth may extend radially outwardly from the mounting lug. The radial direction is relative to the axis of rotation of the lug about the shaft, i.e. the axis of the shaft.

The flapper element may comprise a sealing portion (i.e a flap) that defines a valve opening engaging surface and an opposed surface, and the at least one mounting lug may be located at one end of the sealing portion.

The row may extend in a circumferential direction along a circumferential outer surface of the mounting lug. The circumferential direction is relative to the axis of rotation of the lug about the shaft, i.e. the axis of the shaft.

In an alternative embodiment, the row may extend in a circumferential direction along a radial (end) surface of the lug, with each tooth extending in an axial direction (i.e., parallel to the shaft). The radial surface is relative to the axis of rotation of the lug about the shaft, i.e. the axis of the shaft.

The row may extend around at least 45 degrees, at least 90 degrees, between 90 to 180 degrees, or up to 180 degrees, of the circumferential surface of the mounting lug. The angle may dictate the maximum extent of movement of the flapper element relative to a valve housing, at least in one direction (e.g. the opening direction).

The at least one mounting lug may comprise a pair of mounting lugs. The lugs may be spaced axially (relative to the lug rotation axis, i.e. along the shaft direction) so that the lugs are contiguous with side edges of sealing portions of the flapper element.

The at least one mounting lug may include a non-toothed surface for contacting a complementary surface on a mounting lug of a similar flapper element.

The non-toothed surface may provide a stopping surface to limit the rotation of the flapper elements, so that the sealing portions of the flapper elements do not contact each other in the open position.

The non-toothed surface may be generally planar.

The non-toothed surface may be contiguous with a final tooth in the row. In other words, the non-toothed surface may extend from an end of the row, such that rotation of the two flapper elements causes engagement of the row of teeth and then immediate engagement of the non-toothed surface.

The non-toothed portion may extend generally parallel to the flapper element, and in particular generally parallel to a valve opening engaging surface of the sealing portion of the flapper element.

In certain embodiments, the plurality of gear teeth may be integral with the outer surface of the mounting lug. For example, the plurality of gear teeth may be formed by being machined into the outer surface of the mounting lug.

The row of teeth may include at least five or between five and fifteen teeth, such as about ten teeth.

According to another aspect of the present disclosure, there is provided a check valve comprising a valve housing defining at least one valve opening, first and second flapper elements having the features described above and being pivotably mounted to the valve housing for rotation relative thereto between an open position, in which they permit fluid flow through the at least one valve opening, and a closed position, in which they prevent fluid flow through the valve opening, wherein the first and second flapper elements are engaged with each other via their respective rows of teeth, and at least one shaft received in the mounting lugs of the first and second flapper elements.

The first and second flapper elements are arranged to rotate relative to the at least one shaft. The shaft may be fixed in position relative to the valve housing.

A first shaft may be received in the mounting lug of the first flapper element and a second shaft may be received in the mounting lug of the second flapper element. Alternatively, the mounting lugs of the first and second flapper elements may both rotate on a single (common) shaft.

The check valve may further comprise a pair of shaft mounting posts arranged on opposed sides of the valve opening and configured to receive the at least one shaft. Each mounting post may receive two shafts, if present. The shaft(s) may be fixed relative to the mounting posts.

The valve housing may be a generally annular member and/or generally D-shaped.

The flapper elements may comprise any suitable material, such as nickel steel or an aluminium alloy.

BRIEF DESCRIPTION OF DRAWINGS

Some Exemplary Embodiments and Features of the Present Disclosure Will Now be Described by Way of Example Only, and with Reference to the Following Drawings in which.

DETAILED DESCRIPTION

Figure 1:
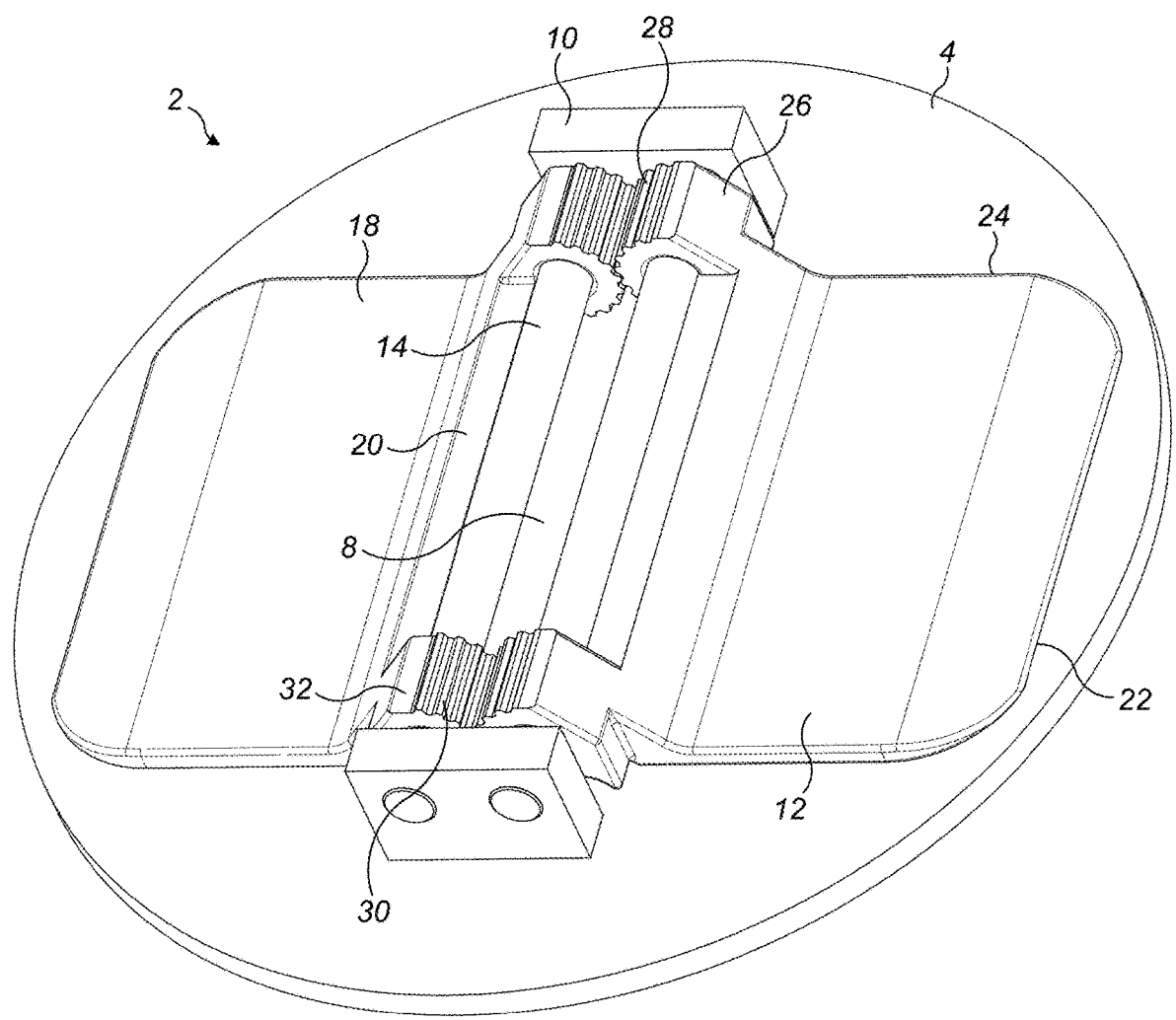
FIG. 1 shows a perspective view of a of check valve in accordance with an embodiment of this disclosure, in a closed position.

A check valve 2 in accordance with an embodiment of this the present disclosure is illustrated in FIGS. 1 to 6.

The check valve 2 comprises a valve housing 4. The valve housing 4 is a generally planar annular element which, in use, may be mounted in a pipe, duct or the like in order to prevent reverse flow of a fluid therethrough. The valve housing 4 comprises a pair of generally D-shaped valve openings 6 which are separated by a central web 8 of the valve housing 4. It will be appreciated that the disclosure is not limited to such a shape of valve openings 6 and other shapes may fall within the scope of this disclosure, depending on valve efficiency requirements, for example.

A pair of mounting posts 10 are arranged on opposed sides of the valve housing 4 and extend upwardly in a perpendicular direction (upwardly in the orientation shown) therefrom. The mounting posts 10 may be integrally formed, for example cast, with the valve housing 4. Alternatively, the mounting posts 10 may be separately formed from the valve housing 4 and mounted thereto by suitable means, for example by welding, brazing or by suitable fastening means. Other mounting post 10 configurations, such as a centrally positioned mounting post, for example, fall within the scope of the present disclosure.

The valve openings 6 are closed by a pair of generally D-shaped flapper elements 12 which are each pivotally mounted to a shaft 14. The shafts 14 are mounted between, and received within, the mounting posts 10 and extend parallel to (and above) the central web 8 of the valve housing 4. It will be appreciated that the present disclosure is not limited to such a shape of flapper elements 12, and other shapes may fall within the scope of this disclosure, depending on the shape of the valve openings 6, for example. The shaft 14 may be a unitary structure (as illustrated), or be constituted from two or more sections, depending upon the check valve 2 construction, for example.

The flapper elements 12 are generally planar and include a sealing portion having a lower valve opening engaging (or sealing) surface 16, an opposed upper surface 18 opposite the lower surface 16, a proximal end 20, a distal end 22 and side edges 24. The lower surface 16 of the flapper elements 12 may be provided with a plurality of recesses (not illustrated), for weight saving purposes, although this is not essential.

The flapper elements 12 are configured to move between an open position and a closed position, permitting or preventing flow through the openings 6 respectively. Each flapper element 12 is shaped and mounted such that when the flapper elements 12 are in the closed position, the lower surface 16 of the flapper elements 12 engage the valve housing 4 around the periphery of the valve openings 6, forming a seal therebetween.

As discussed so far, the construction of the check valve 2 is conventional. However, each of the flapper elements 12 includes two mounting lugs 26, positioned at opposite sides of its proximal end adjacent the mounting posts 10. The mounting lugs 26 include respective bores 28 through which the respective shaft 14 extends, thereby pivotally mounting the flapper elements 12 to the valve housing 4. It will be appreciated that other mounting lug 26 arrangements may fall within the scope of this disclosure, such as a single central mounting lug 26, for example, that may or may not extend across the full width of the flapper element 12.

In the illustrated embodiment, each of the mounting lugs 26 includes an outer surface 28, a portion of which includes a row of radially outwardly extending teeth 30 formed thereon for engagement with teeth 30 of a corresponding similar mounting lug 26 on an adjacent flapper element 12.

In certain embodiments, the outer surface 28 of the mounting lug 26 includes about ten teeth 30. In certain embodiments, the teeth 30 are disposed around at least 90 degrees, or about 180 degrees, of the outer surface 28 of the mounting lug 26. It will, however, be appreciated that the arrangement shown in the figures are purely illustrative, and the size, shape, number of, and spacing between, the teeth 30 on the outer surface 28 of the mounting lug 26 may vary and still fall within the scope of the present disclosure.

In this embodiment, the outer surface 28 of the mounting lug 26 also includes a non-toothed surface 32 at one end of the row of teeth 30, positioned so as to contact a corresponding non-toothed surface 32 of a similar mounting lug 26 when the flapper elements 12 are in the fully open position. Hence, the non-toothed surface 32 acts as a stop surface to prevent the movement of each flapper element 12 beyond a maximum desired opening angle. In the illustrated embodiment, the non-toothed surface 32 is planar and extends parallel to the lower surface 16 of the flapper element 12, such that the maximum opening angle is 90 degrees. This means that the two flapper elements will always remain spaced part, even in the fully open position, thus negating the need for any stop bars provided between the flapper elements 12 or on the upper surface 18. The non-toothed surface 32 may be contiguous with a final tooth 30a in the row of teeth 30.

It will be appreciated, however, that the non-toothed surface 32 may extend at any suitable angle to the lower surface 16 of the flapper element 12, if the desired maximum opening angle were less than 90 degrees, for example. It will be appreciated that the maximum angle may, for example, be determined or chosen so as to facilitate optimal forces upon the flapper elements 12 and/or to permit an optimal fluid flow through the valve 2.

Figure 2:
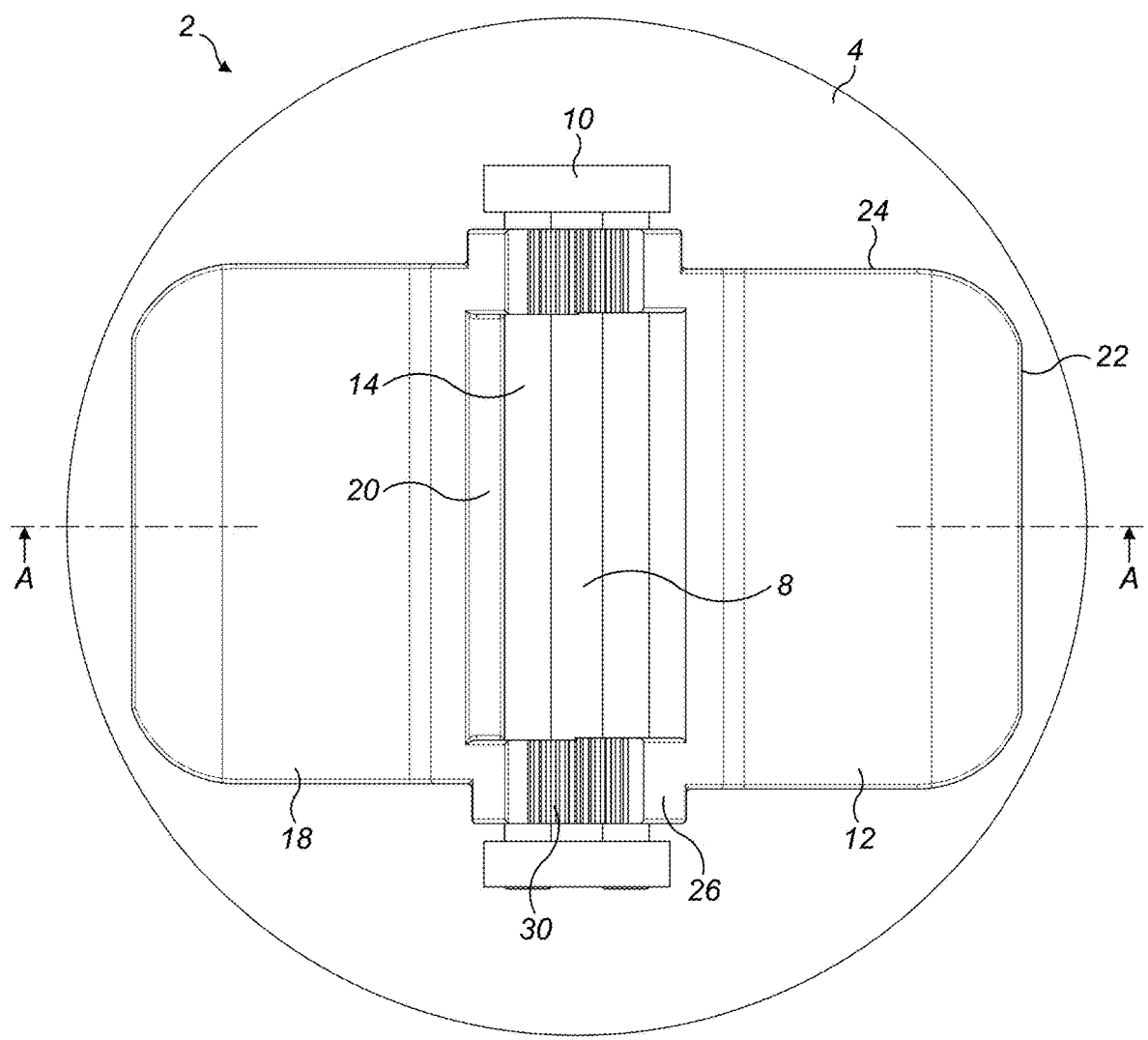
FIG. 2 shows a top view of the check valve of FIG. 1.
Figure 3:
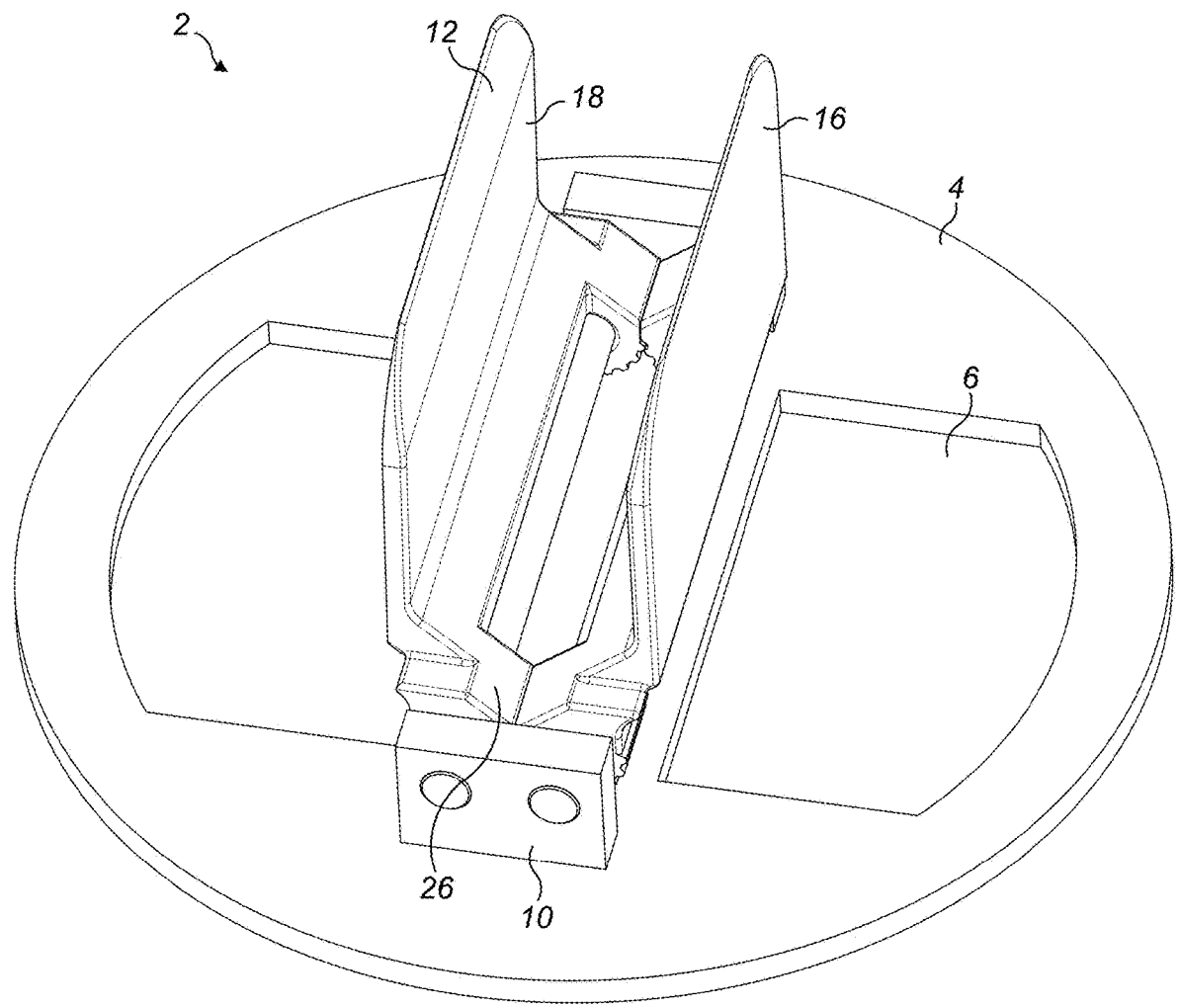
FIG. 3 shows a perspective view of a check valve in accordance with an embodiment of this disclosure, in an open position.
Figure 4:
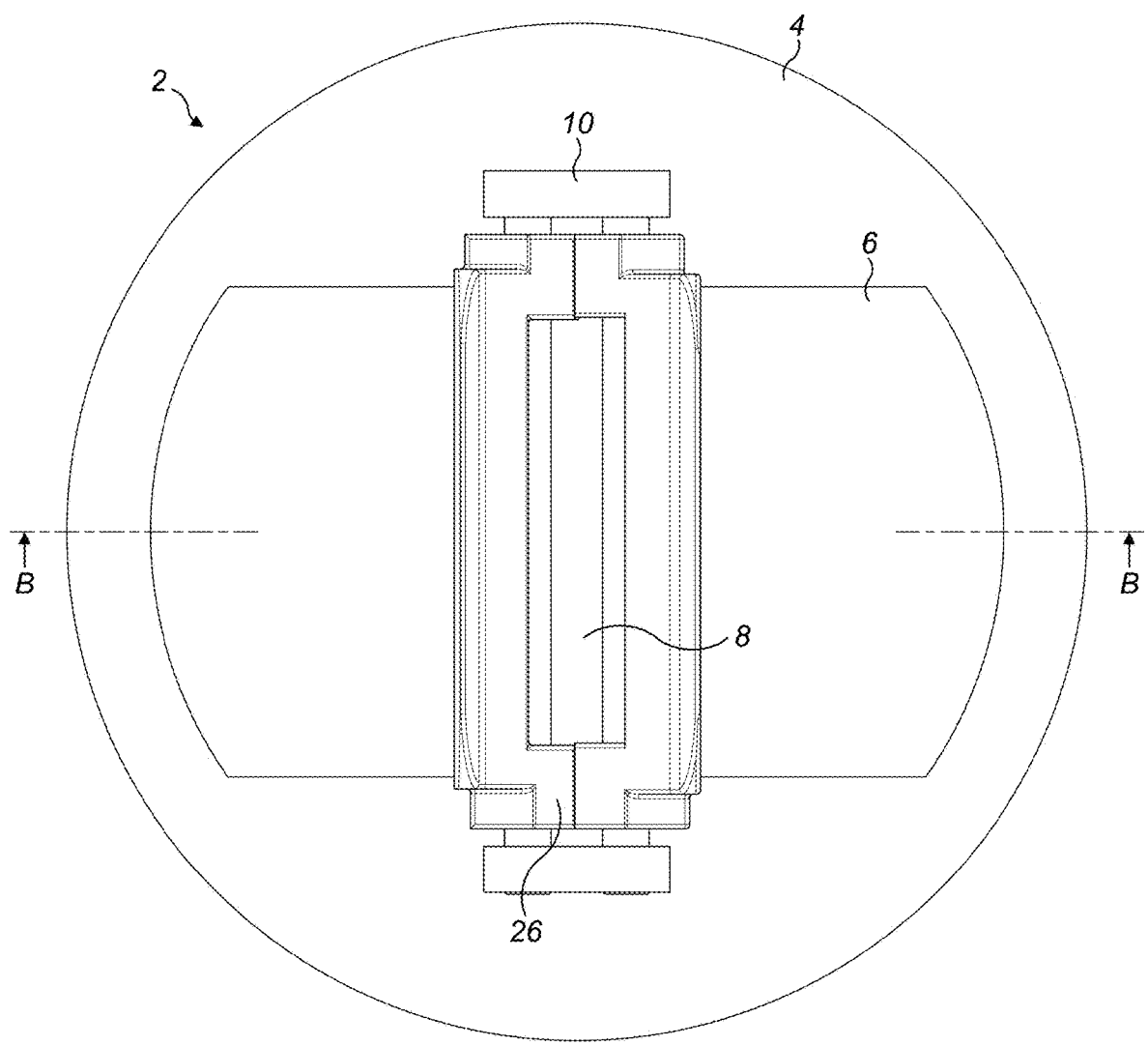
FIG. 4 shows a top view of the check valve of FIG. 3.
Figure 5:
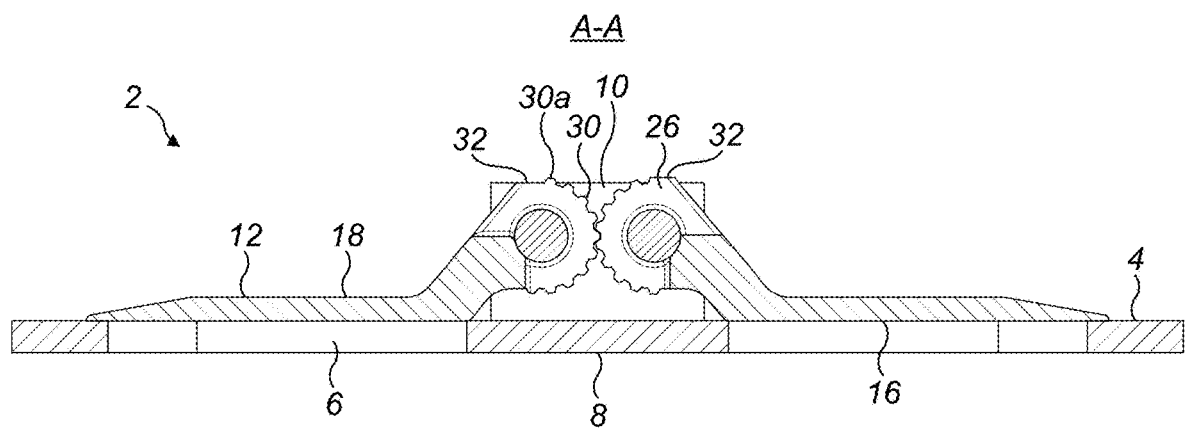
FIG. 5 shows a side view of the check valve of FIGS. 1 to 4, in a closed position.
Figure 6:
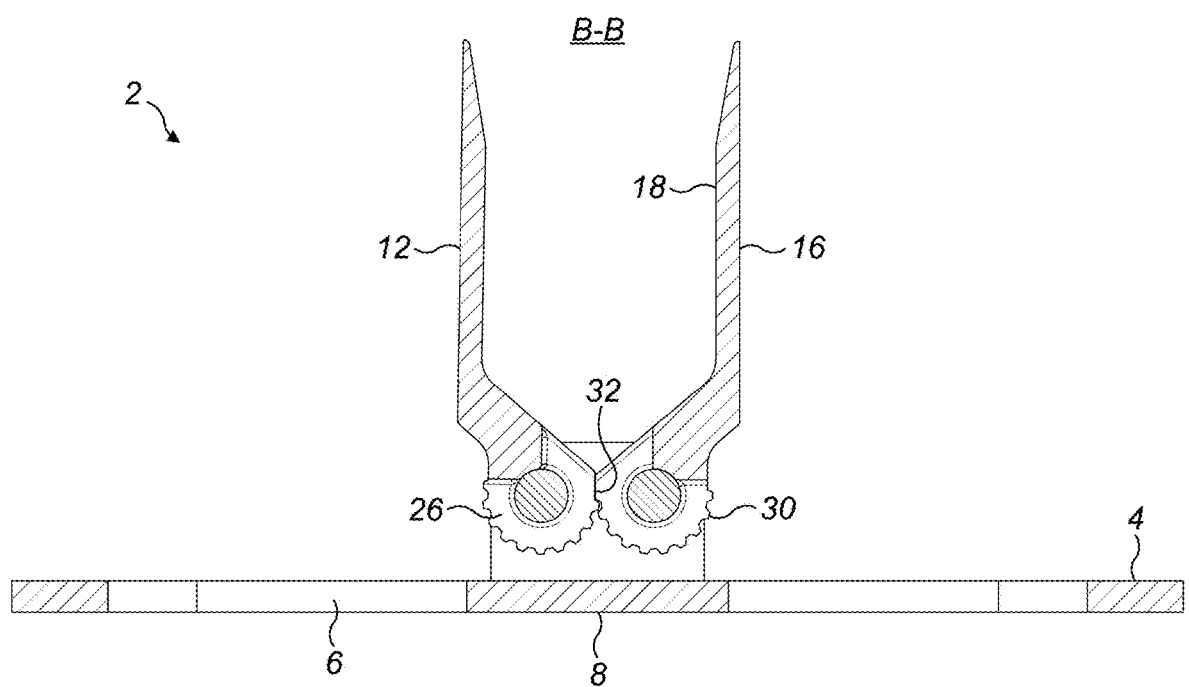
FIG. 6 shows a side view of the check valve of FIGS. 1 to 5, in a fully open position.

In operation, each of the adjacent flapper elements 12 is configured to move pivotally about the shaft 14 between a closed position as shown in FIGS. 1, 2 and 5, and a fully open position as shown in FIGS. 3, 4 and 6 (and vice versa).

The closed position of the valve 2 is maintained when the fluid pressure being applied to the lower surfaces 16 of each of the flapper elements 12 is less than that of the predetermined cracking pressure and/or any other forces that may be acting upon the flapper elements 12. One skilled in the art will understand the "cracking pressure" to be the minimum upstream fluid pressure that is required for the valve 2 to operate (i.e. the minimum pressure required to cause the flapper elements 12 to begin to move into the open position).

Once the upstream fluid pressure equals that of the predetermined valve cracking pressure and/or any biasing forces acting on the flapper elements 12, the flapper element(s) 12 will begin to open, with increased pressure moving the flapper elements 12 into their fully open positions at which point the non-toothed surfaces 32 of each of the mounting lugs 26 contact one another, preventing movement there beyond. It will be appreciated, although not illustrated, that the entirety of the outer surface 28 of the mounting lugs 26 may comprise teeth 30 (i.e. omitting the non-toothed surfaces 32), and the upper surface 18 of the flapper elements 12 may include separate stop elements secured thereto (and/or a stop bar between the flapper elements 12) in order to limit the movement of the flapper elements 12 to the maximum opening angle.

When the maximum opening angle is reached, each flapper element 12 is held in this position by the upstream fluid pressure. As illustrated in FIGS. 1, 2, 5 and 6, the teeth 30 on each mounting lug 26 are maintained in an engaged relation during valve operation. Hence, the movement of one of the flapper elements 12 ensures the simultaneous degree of movement in the corresponding adjacent flapper element 12. This desirably ensures that, in the event of an asymmetric upstream pressure gradient across the flapper elements 12, for example, both flapper elements 12 open simultaneously to permit the flow of fluid therethrough.

In the event that an upstream fluid pressure drop is experienced, such that the upstream fluid pressure does not equal or exceed the cracking pressure and/or any other forces acting on the flapper elements 12, or if the downstream fluid pressure exceeds the upstream fluid pressure, the flapper elements 12 will be urged into the closed position. As when moving into the open position, when moving into the closed position, each of the flapper elements 12 pivots about the hinge pin 14 simultaneously due to the engagement of the teeth 30 on the respective mounting lugs 26, albeit in the opposite direction.

In any of the aforementioned embodiments, the engagement of the teeth 30 on the mounting lugs 26 ensures simultaneous actuation of the flapper elements 12 within the valve 2 without the need for complex actuation systems as in prior check valves. Additionally, the non-toothed surfaces 32 of the mounting lugs 26 provide an increased contact area between the flapper elements 12 during impacts therebetween, which may increase the impact force absorption within the flapper elements 12. This not only allows the flapper elements 12 to be made lighter than in prior check valves, but also may improve valve lifespan and improve valve efficiency.

The material chosen to manufacture the flapper elements will 12 depend on the particular application. For example, in low temperature and/or pressure applications, an aluminium alloy may be a suitable material. For higher temperature and/or temperature applications, a steel, such as a nickel steel (for example Inconel®) or a stainless steel may be appropriate. Similar materials may be used for the valve housing 4 and mounting posts 10.

It will be appreciated that the flapper element 12 construction disclosed herein may be employed in new check valve constructions, and potentially also in the refurbishment or repair of existing check vales where the prior flapper elements 12 may be replaced with the new construction.

The figures and the accompanying description above describe a particular embodiment of the disclosure and it will be understood that modifications may be made to the described embodiment without departing from the scope of the disclosure.

The invention claimed is:

1. A check valve comprising:
   a valve housing defining at least one valve opening;
   a first shaft;
   a second shaft;
   a first flapper element that includes a first mounting lug configured to receive the first shaft for rotation relative thereto, the first mounting lug having a first row of teeth and a first generally planar non-toothed surface; and
   a second flapper element that includes a second mounting lug configured to receive the second shaft for rotation relative thereto, the second mounting lug having a second row of teeth and a second generally planar non-toothed surface;
   wherein the first row of teeth engage with the second row of teeth;
   wherein the first flapper element and the second element are pivotably mounted to the valve housing for rotation relative thereto between an open position, in which they permit fluid flow through the at least one valve opening, and a closed position, in which they prevent fluid flow through the valve opening,
   wherein the first generally planar non-toothed surface contacts the second generally planar non-toothed surface in the open position of the flapper.

2. The check valve of claim 1, wherein the first row of teeth extend radially outward from the first mounting lug and the second row of teeth extend radially outward from the second mounting lug.

3. The check valve of claim 2, wherein the first row of teeth extends in a circumferential direction along a circumferential surface of the first mounting lug and the second row of teeth extends in a circumferential direction along a circumferential surface of the second mounting lug.

4. The check valve of claim 3, wherein the first row of teeth extends around at least 45 degrees the circumferential surface of the first mounting lug.

5. The check valve of claim 1, wherein the first flapper element comprises a first valve opening engaging surface and the first generally planar non-toothed surface extends parallel to the first valve opening engaging surface.

6. The check valve of claim 1, wherein the first generally planar non-toothed surface of the first flapper element is contiguous with a final tooth in the first row of teeth.

7. The check valve of claim 1, wherein the teeth in the first row of teeth are integral with the an outer surface of the first mounting lug.

8. The check valve of claim 1, wherein the first row of teeth includes at least five teeth.

9. The check valve of claim 1, further comprising a pair of shaft mounting posts arranged on opposed sides of the valve opening and configured to receive the first shaft and the second shaft.

10. The check valve of claim 1, wherein the valve housing is generally annular.

\* \* \* \* \*